No. 747,248. PATENTED DEC. 15, 1903.
J. J. SLEEPER.
VENDING MACHINE.
APPLICATION FILED MAR. 2, 1903.
NO MODEL.

No. 747,248. Patented December 15, 1903.

UNITED STATES PATENT OFFICE.

JOSEPH J. SLEEPER, OF PHILADELPHIA, PENNSYLVANIA.

VENDING-MACHINE.

SPECIFICATION forming part of Letters Patent No. 747,248, dated December 15, 1903.

Application filed March 2, 1903. Serial No. 145,642. (No model.)

*To all whom it may concern:*

Be it known that I, JOSEPH J. SLEEPER, a citizen of the United States, residing in the city and county of Philadelphia, State of Pennsylvania, have invented new and useful Improvements in Vending-Machines, of which the following is a specification.

My invention consists of an improvement in the class of vending-machines known as "coin-controlled" vending-machines, the same embodying novel means for properly supplying a trough or receiver with the commodity vended and for discharging the same therefrom, avoiding clogging of the supply-chamber, as will be hereinafter set forth.

Figure 1:
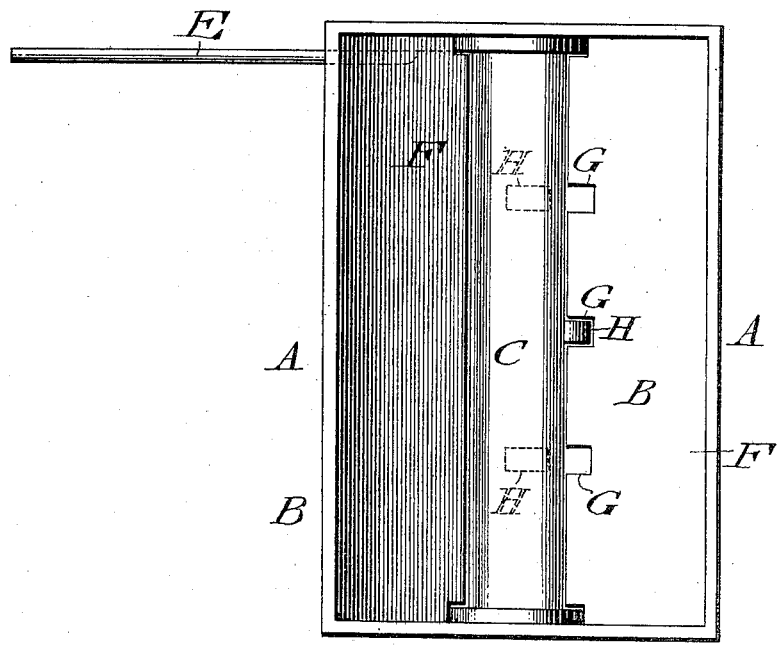
Figure 2:
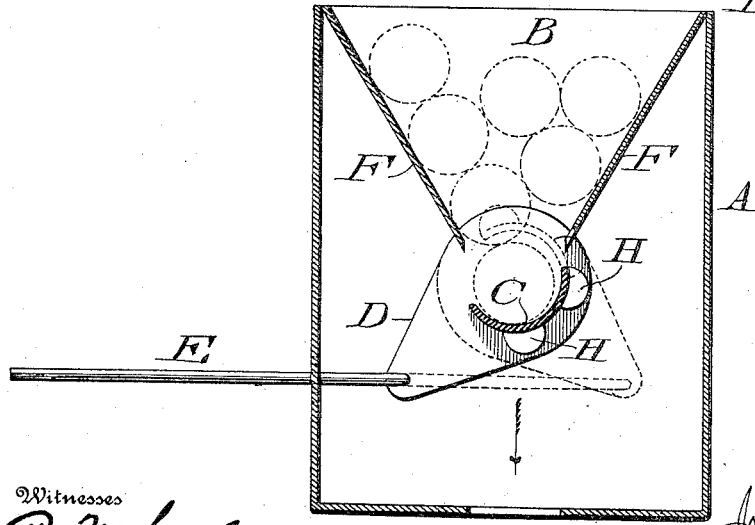

Figure 1 represents a top or plan view of a vending-machine embodying my invention. Fig. 2 represents a vertical section thereof.

Similar letters of reference indicate corresponding parts in the figures.

Referring to the drawings, A designates a portion of the frame of a coin-controlled vending-machine, and B designates the supply-chamber of the machine, the same being of the form of a hopper.

C designates a trough or tray which is open on top and mounted on the walls of the portion A, so as to oscillate thereon, whereby the trough may be overturned and bring its open top to the side below, so as to discharge contents thereof, it being noticed when the parts are in normal position the open top of the trough is in communication with the bottom of the supply-chamber B. Secured to an end or journal of the trough is the crank-arm D, with which latter is connected the rod E, so that motion may be imparted to said chute to turn the same, said rod extending to a proper part of the machine, where it will be operated by a suitable device due to the insertion of a coin, said device not being shown.

In the bottom of the walls F of the chamber or hopper B are recesses G, and on the under side of the trough C are lugs H, which project outwardly therefrom and are adapted to pass through said recesses, it being noticed that the outer surfaces of said lugs are rounded or otherwise humped, said lugs forming what I term as "lifters" for purposes to be hereinafter described.

The operation is as follows: The chamber B is supplied with articles of a commodity to be vended, which in the present case are shown in dotted outlines as cigars, one of which has entered the trough C. When a coin is properly introduced into the machine, motion is imparted to the rod E, whereby the trough is overturned and the article therein is discharged therefrom and may be directed to the place where the depositor of the coin may receive the same. As the trough rotates the lifters H follow the motion of the trough and bear upwardly against the lowermost article (or articles) in the chamber B, thus elevating the same and placing it clear of the path of the advancing trough, so that no other article can enter the trough and crushing and clogging of the contents of the chamber B is prevented, the same being true on the return motion of the trough, it being evident that after the article is placed in position for possession of the same by the depositor of the coin the trough resumes or is caused to resume its normal position, as shown in full lines, Fig. 2.

Having thus described my invention, what I claim as new, and desire to secure by Letters Patent, is—

1. In a vending-machine of the character stated, a trough, a supply-chamber with which said trough is primarily in communication, means for overturning said trough and means on the outer face of said trough and rotatable therewith adapted to engage with and elevate the contents of said chamber.

2. In a vending-machine of the character stated, an oscillating trough, means for operating said trough, a supply-chamber with which said trough is primarily in communication and projecting means on the back of said trough and carried thereby for lifting the contents of said chamber.

3. In a vending-machine of the character stated, an oscillating trough, a supply-chamber with which said trough is primarily in communication and a device projecting from said trough adapted to enter said chamber and lift the contents thereof.

4. In a vending-machine of the character stated, a trough adapted to overturn, means for operating the same, a projection on the back of said trough and a supply-chamber above said trough, the base of a wall of said chamber having a recess through which said projection may pass to enter said chamber, said projection being adapted to lift the contents of said chamber.

JOSEPH J. SLEEPER.

Witnesses:
 JOHN A. WIEDERSHEIM,
 WM. CANER WIEDERSHEIM.